United States Patent [19]

Say et al.

[11] Patent Number: 5,143,647
[45] Date of Patent: Sep. 1, 1992

[54] SYNTHESIS GAS GENERATION STARTUP PROCESS (C-2556)

[75] Inventors: Geoffrey R. Say; James H. Taylor; David C. Long, all of Baton Rouge, La.; Rocco A. Fiato, Basking Ridge, N.J.

[73] Assignee: Exxon Research and Engineering Company, Florham Park, N.J.

[21] Appl. No.: 711,697

[22] Filed: Jun. 7, 1991

[51] Int. Cl.$^5$ .............................................. C07C 27/14
[52] U.S. Cl. .................................... 252/373; 518/707
[58] Field of Search ....................... 252/373; 518/707

[56] References Cited

U.S. PATENT DOCUMENTS 2,546,606  3/1951  Mayland .............................. 252/373
4,888,131  12/1989  Goetsch et al. ..................... 252/373

Primary Examiner—Marianne M. Cintins
Assistant Examiner—Michael B. Hydorn
Attorney, Agent, or Firm—Jay Simon

[57] ABSTRACT

Start-up procedure for FBSG process involving starting up under oxidizing conditions with $Al_2O_3$ (no Ni) particles in the bed and the switching to reducing conditions prior to adding $Ni/Al_2O_3$ catalyst. This procedure will prevent catalyst particle agglomeration.

11 Claims, No Drawings

SYNTHESIS GAS GENERATION STARTUP PROCESS (C-2556)

FIELD OF THE INVENTION

This invention relates to a process for starting up a fluid bed or spouted bed reactor process for preparing synthesis gas, carbon monoxide and hydrogen, from lower alkanes, preferably methane, in the presence of a suitable steam reforming catalyst. More particularly, this invention relates to starting up a process for reacting a lower alkane, e.g., methane, with oxygen in the presence of other gas phase components, preferably steam and carbon dioxide, at elevated temperatures and pressures, and substantially reducing the tendency of the catalytic materials to agglomerate.

In fluid bed processes the entire solids inventory is in a state of fluidization, while in spouted bed processes only that portion of bed through which the gases are injected are in a fluidized state.

BACKGROUND OF THE INVENTION

The production of synthesis gas by either partial oxidation or steam-reforming is well known and there are extensive literature references to these processes. The processes may be used separately or they may be combined. Thus, the steam-reforming reaction is highly endothermic and is described as:

$$CH_4 + H_2O \rightarrow CO + 3H_2$$

while the partial oxidation reaction is highly exothermic and is described by:

$$CH_4 + O_2 \rightarrow CO + H_2 + H_2O$$

The combined reaction employing a 2/1 CH4/O2 feed ratio is described as:

$$2 CH_4 + O_2 \rightarrow 2CO + 4H_2$$

In addition to these reactions, the mildly exothermic water gas shift reaction also occurs:

$$CO + H_2O \rightarrow H_2 + CO_2$$

The representation of the combined process shows that the ratio of produced hydrogen to carbon monoxide is 2/1, the approximate stoichiometric hydrogen/carbon monoxide ratio for producing higher hydrocarbons by a hydrocarbon synthesis process, such as the Fischer-Tropsch process over a catalyst with little or no water gas shift activity.

A number of patents illustrate these processes, and U.S. Pat. No. 4,888,131 contains an extensive, but not exhaustive listing thereof.

Fluid bed processes are well known for the advantages they provide in heat and mass transfer characteristics. Such processes allow for substantially isothermal reactor conditions, and are usually effective in eliminating temperature runaways or hot spots; however, with O2 injection complete elimination of hot spots is impossible although the fluid bed does tend to minimize the intensity. They are not, however, without their disadvantages: catalyst strength or attrition resistance is important for maintaining the integrity of the catalyst and minimizing the formation of fine particles that may be lost from the system, especially those particles not recoverable by use of cyclones and deposited in down stream equipment causing fouling or reverse reactions as temperature is decreased; erosivity, or the tendency to erode equipment must be contained, since attrition resistance is often an inverse function of erosivity.

Additionally, the relatively high temperatures, e.g., above about 1650° F., found in reforming reactions where oxygen is present can cause agglomeration of the catalyst particles leading to lower catalytic efficiency (e.g., lower conversion), larger particles that are more difficult to fluidize, greater wear on equipment due to greater momentum and impact forces, and clogging of lines. For example, a common catalytic material, nickel, even when deposited in small amounts on a suitable carrier, e.g., less than about 5 wt % nickel on a support, tends to soften at reaction temperatures (due to its reactivity with the support phase with concomitant formation of reactive/lower melting mono- and polymetalic oxide phases), which become sticky, and generally lead to particle agglomeration. Particle agglomeration, in fact, tends to increase as the amount of nickel present in the catalyst bed increases or as the Ni containing phase is subjected to multiple oxidizing and reducing cycles as it is transported through the fluid bed. The behavior of Ni/Al2O3 in H2 and steam rich environments has been reported, E. Ruckenstein et al, *J. Catalysis* 100 1-16 (1986). Thus, maintaining the amount of nickel at rather low levels in the catalyst bed minimizes particle agglomeration. On the other hand sufficient nickel is required for providing economical feed conversions to synthesis gas, i.e., within about 250° F. approach to equilibrium, thereby minimizing the level of CH4 exiting the syngas generation zone.

Processes similar to fluid-bed steam reforming processes for the preparation of synthesis gas are also illustrated by U.S. Pat. No. 4,758,375 and European patent publication 0163 385 B1 relating to spouted-bed technology and the use of inert materials in the bed.

An object of this invention, therefore, is taking advantage of fluid bed or spouted bed processes for the production of synthesis gas from lower alkanes, e.g., methane, while substantially eliminating particle growth at elevated temperatures.

SUMMARY OF THE INVENTION

We have found that particle agglomeration in fluidized reaction zones for the conversion of a lower alkane to synthesis gas, carbon monoxide and hydrogen, can be substantially reduced or eliminated by heating an inert bed of fluidized particles, preferably alumina, to reaction temperatures in an oxidizing atmosphere, and switching to a reducing atmosphere before introducing substantial amounts of a catalyst, e.g., a nickel containing reforming catalyst.

While small amounts of nickel containing catalyst can be present in the reaction zone prior to converting to reducing conditions, the amount of catalyst present should not be more than that required for maintaining the methane concentration below about 12% in the product gases and for a period insufficient to result in substantial particle agglomeration, i.e., the catalyst should be present for no more than about 8 hours prior to going from oxidizing conditions in the reaction zone to reducing conditions in the reaction zone.

The presence of the small amount of catalyst prevents the methane leak, i.e., methane concentration in the product gas, from causing the formation of higher hydrocarbons and fouling downstream equipment.

While not wishing to be bound by any particular theory, the normal operation involving heating a bed of nickel containing particles, e.g., Ni/Al$_2$O$_3$, in an oxidizing atmosphere leads to the formation of a nickel-support compound, e.g., NiAl$_2$O$_4$, which when conditions are changed to reducing conditions for producing the synthesis gas, leads to the formation of small particles of Al$_2$O$_3$, i.e., about 100Å of Al$_2$O$_3$, which are prone to sintering and the formation of agglomerates.

DETAILED DESCRIPTION OF THE INVENTION

The fluid bed may be heated in a variety of ways, e.g., by use of a removable auxiliary burner or simply by combustion of feed gas with the oxygen. In any case, the oxidizing atmosphere is maintained by furnishing oxygen in amount in excess of the stoichiometric amount required for complete combustion of the fuel. Preferably, at least 20% excess oxygen above that required for stoichiometric combustion is used. Heating of the inert particles continues until the reaction temperature is obtained, e.g., at least about 1650° F., whereupon conditions in the bed are changed to a reducing atmosphere. This change can be accomplished by reducing oxygen feed, increasing gas feed, or preferably, both. Upon obtaining a steady state reducing environment, sufficient catalyst, preferably nickel containing catalyst, is added to promote the conversion of the feed gas to hydrogen and carbon monoxide.

The steam-reforming, partial-oxidation process contemplated herein operates in a reactor wherein at least one part of the solids inventory is in a fluidized state and wherein heat carrying or heat transfer materials are suspended in a flowing fluid at average bed temperatures above about 1650° F., preferably at or above about 1700° F. As the preferred pressure decreases to about 10-20 atm, the preferred operating temperature would be decreased accordingly to maintain desired methane conversion. By virtue of this invention the high end of the temperature range is no longer limited by catalyst disintegration or catalyst agglomeration and the temperature may range to within about 50° F. of the incipient softening point of the heat carrying, essentially non-catalytic materials. (By non-catalytic we mean that the steam-reforming or partial oxidation process is either not catalyzed or only poorly catalyzed by the heat carrying materials. Thus, the heat carrying solids are inert or substantially inert for this steam-reforming or partial -oxidation reaction.) More preferably, however, average bed temperatures may range from about 1650° F. to 2000° F., still more preferably from about 1700° F. to about 1850° F., for the preferred operating pressure of 20-40 atm; however, reaction pressures may vary widely, for example, from about atmospheric pressure to about 100 atmospheres. Where the product synthesis gas will be used in hydrocarbon synthesis reactions, the pressure may be chosen so that intermediate recompression of the synthesis gas can be avoided and the synthesis gas will flow directly, after some product separation and fines recovery, to the hydrocarbon synthesis reactor, e.g., at pressures of about 10-50 atmospheres, preferably 10-40 atmospheres, more preferably 20-40 atmospheres.

The feed material to be reformed is any reformable alkane, usually a lower alkane, e.g., C$_1$-C$_4$, preferably comprising methane or natural gas which contains a high concentration of methane, e.g., greater than about 70% methane, preferably greater than 80% methane, more preferably, greater than 90% methane based on the total carbon content of the feed. Such feed gases will likely contain up to about 10% ethane, up to about 3% propane and trace amounts of C$_4$-C$_8$. Condensate and known contaminants, such as hydrogen sulfide, in the gas should be removed, e.g., by well known processes. Typical feeds may also contain some CO$_2$ and nitrogen as well as some CO, H$_2$, olefins and oxygenated products from recycle operations, e.g., from Fischer-Tropsch processes.

The inert solids may be any fluidizable material that maintains its integrity at reaction conditions. These materials may be Group II metal oxides, rare earth oxides, alpha alumina, modified alpha aluminas, or alpha alumina containing oxides.

The inert materials are generally attrition resistant at reaction conditions and have a mean particle diameter ranging from about 20 to 150 microns, preferably 30-150 microns, more preferably 30-120 microns. Alumina materials, especially fused tabular alumina, described in U.S. Pat. Nos. 4,888,131 and 4,952,389 are particularly applicable for inert materials and the description of the alumina materials therein is hereby incorporated herein by reference. Generally, these materials are at least about 98% alpha alumina with substantially no silica. Silica tends to volatilize to Si(OH)$_4$ at reaction temperatures, impairing the integrity of the particle. Silica content is, therefore, less than about 1 wt %, preferably less than about 0.5 wt %. Preferred materials are alpha aluminas, tabular or fused, and rare earth stabilized alpha aluminas, e.g., containing about 0.1 to 1.0 wt % rare earth.

Materials useful as inert solids generally have rather low surface areas, e.g., less than about 2 m$^2$/gm, usually less than about 1 m$^2$/gm.

These inert materials are substantially inert or non-catalytic with respect to the steam-reforming reaction. Consequently, even though not preferred, these materials may be comprised of spent or deactivated catalyst. The reforming reaction itself may lead to deactivation of the catalyst, particularly nickel containing catalysts, which may then be used as inert solids.

The catalyst used herein may be any conventional steam-reforming catalyst, or autothermal or combined reforming catalyst. Such catalysts can be described as being selected from the group consisting of uranium, Group VII metals, and Group VIII noble and non-noble metals. The metals are generally supported on inorganic refractory oxides similar to the inert materials already described. Preferred catalyst metals are the Group VIII metals, particularly nickel. In the case of nickel, any nickel containing material is useful, e.g., nickel supported on alpha alumina, nickel aluminate materials, nickel oxide, nickel on a rare earth, e.g., La, modified alumina, and preferably a supported nickel containing material.

The catalyst may have a similar particle size distribution as that found in the inert material or it may have a somewhat larger particle size, e.g., from 70-250 microns or larger. The larger particles may be more sintering resistant.

The amount of catalyst added to the bed is that sufficient to bring the activity to within 250° F. of equilibrium, preferably to within 100° F. of equilibrium, more preferably to within 50° F. of equilibrium when the overall reaction is being carried out at relatively high pressures, e.g., 20-40 atm, where achieving high levels of CH$_4$ conversion would otherwise be difficult.

The steam-reforming reaction is equilibrium limited. That is, at any particular reaction temperature an equilibrium conversion can be calculated based on the partial pressure of the gaseous component of the system and the relative rate constants of the forward and reverse reactions. This calculation is easily established and carried out by one skilled in the art. However, calculating the equilibrium conversion at any particular temperature is not a part of this invention. The only importance it plays is that the activity of the catalyst is such that the conversion of feed, e.g., methane, to synthesis gas is such that it is equal or greater to that which would be obtained within 250° F. approach to the equilibrium conversion for a particular temperature. Thus the approach to equilibrium is simply another way of measuring effective activity of the catalyst-heat transfer solids mixture.

In order to minimize the ability of a catalyst, e.g., nickel containing catalyst, to cause particle agglomeration, the amount of nickel containing particles in the reaction bed should be minimized while maintaining sufficient nickel for providing adequate catalyst activity. Consequently, the nickel loading on a supported particle should be reasonably high, for example, 1 wt % to 20 wt %, bearing in mind that the support usually has a low surface area, with little porosity and can hold relatively low amounts of catalytic metal. The nickel loading in the bed constituted of heat carrying, relatively inert particles and supported nickel, catalytic particles should be at least about 0.01 wt % based on total bed solids, preferably at least about 0.02 wt %, more preferably about 0.02 wt % to about 3.0 wt %, and most preferably about 0.2 wt % to 1.5 wt %. This loading is for nickel acting as a catalyst for the steam reforming reaction, i.e., active nickel, since there may be some totally or substantially deactivated nickel, i.e., spent nickel, in the reaction zone acting as an inert solid. Since the nickel loading on the catalytic particle may vary widely, as stated above, the amount of nickel containing catalytic solids can be easily calculated based on the total bed weight, the weight of nickel in the total bed, and the nickel loading on the nickel containing solids.

The catalyst containing material may be added continuously to the fluid-bed or may be added at regular intervals. Significant increases or decreases in the weight of the fluidized material should be avoided so as not to disturb the fluidizing characteristics of the bed. Thus, the rate and timing of the addition of catalyst should be, generally, balanced by the normal losses from any fluid-bed system, that is, fines or materials of less than about 20 microns mean diameter which cannot be trapped by cyclones for return to the bed, and other materials, such as spent catalyst that is removed from time to time from the fluid-bed.

Regardless of whether active catalytic material is continuously fed to the fluid-bed or spouted-bed or injected at regular or irregular intervals, the rate and timing of catalyst addition is such that conversion of feed, e.g., methane, and feed leak or methane leak, i.e., the volume % of unconverted feed or methane in the product gases, is within 250° F. of equilibrium. One skilled in the art can easily picture a plot of activity (ordinate) v. time (abscissa) where the activity line is relatively horizontal (constant addition of fresh or active catalyst) or effects a saw tooth-type curve (periodic addition of fresh or active catalyst where activity decreases with time and then jumps with each injection of catalyst).

The unconverted feed or methane leaving the fluid-bed as product gas is usually less than about 12% preferably less than about 89%, more preferably less than about 8%, more preferably less than about 5% based on the total level of the hydrocarbon or methane being fed to the reactor.

The design and engineering of fluid-bed or spouted-bed reactors for the conversion of methane or lower alkanes to synthesis gas is easily accomplished with relationships and techniques well known in the art, see, e.g., O. Levenspiel and K. Dunii, Fluidization Engineering, Wiley, New York (1969) the references therein and see K. Mathane and N. Epsteain, Spouted Beds, Academic Press, New York, 1974 and references therein.

The steam-reforming partial-oxidation reaction is carried out in the presence of steam and oxygen. The alkane feed to steam molar ratio is at least about 1, preferably about 1 to 3, more preferably 1.5 to 2.5. The oxygen to alkane feed molar ratio is about 0.2 to 1.0, preferably 0.4 to 0.6. The oxygen is added to provide the sensible heat for reactants and to maintain the overall reaction temperature at a desired level. When oxygen is employed, the alkane feed and oxygen should be separately diluted with steam and/or $CO_2$ and preheated before injection into the fluidized bed reaction zone.

PREFERRED EMBODIMENT

About 5K lbs. of tabular $Al_2O_3$ with an average particle size of about 55 microns was loaded into the reactor and a gas flow was established to give a gas velocity of about 1 ft/sec at around 30 psig pressure. The tabular $Al_2O_3$ had <0.1 wt % $SiO_2$ and $NaO_2O$ and contained no Ni. The gas consisted of a mixture of $CO_2$, $N_2$, and $O_2$ with a composition having about 25-30% $O_2$. In this operation, the reactor contained facilities for heating the catalyst by means of a removable auxiliary burner which was mounted in the reactor above the bed level (as long as the bed is no greater than 5K lbs.). The auxiliary burner was used to heat the bed to a temperature of at least 1200° F. At this point the gas composition was still in an overall oxidizing mixture. A small amount of natural gas was then allowed to enter the bottom of the reactor and undergo complete combustion. The entire bed was then heated up to about 1700° F. by increasing the natural gas in the feed, while continuing to maintain excess $O_2$. When the temperature was increased to about 1700° F., the auxiliary burner was removed and additional tabular $Al_2O_3$ was added to bring the total bed up to about 9K lbs. and the pressure was increased to about 70 psig. All during this time the velocity was maintained at about 1 ft/sec.

At this point in the operation the $O_2$ flow rate was adjusted to produce a gas mixture with about 8% $O_2$. Complete combustion of the feed natural gas was occurring and the outlet gas composition contained $CO_2$, $N_2$, $H_2O$, along with the 8% $O_2$. A quantity of Ni containing catalyst (55 lbs. of catalyst containing 8% Ni) was then added to the 9K lbs. of tabular $Al_2O_3$ giving an overall bed Ni composition of about 0.05 wt %. Within about 2 hours of adding the Ni, the feed gas composition was adjusted by reducing the $O_2$ and by increasing the $CH_4$ in order to result in a net reducing environment. The switch to reducing conditions occurred over a transition of about 5-15 minutes.

The gas composition was then further adjusted to give a ratio of about 0.5 moles of $O_2$ per mole of $CH_4$, 0.7 moles of steam/mole of $CH_4$ and 0.28 moles of $CO_2$/mole of $CH_4$. The reactor pressure was increased up to the desired level of 345 psig. These changes were made while maintaining the reactor temperature at about 1700° F. and a velocity of about 1.3 ft/sec. At these target conditions, the $CH_4$ in the syngas was about 6 mole %. Operating conditions were held constant for about one week and then additional Ni containing catalyst was added to bring the average bed Ni content up to about 0.3 wt %.

DETERMINATION OF INITIAL SINTERING TEMPERATURES

A test was conducted on samples of 1% Ni on alpha alumina. Sample (1) consisted of fresh catalyst; Sample (2) consisted of fresh catalyst that was exposed to an extended 10+ day combustion/heat-up period prior to the syngas production step of the present invention.

Constant heating rate (CHR) pushrod dilatometry tests were conducted on these samples to determine their initial sintering (i.e., incipient softening) temperatures. The specific analytical procedure employed in this example is reported; see P. Compo, R. Pfeffer and G. I. Tardos, Powder Technology, vol. 51, pp. 85-101 (1987).

Samples of 1% Ni supported on alpha alumina were first sieved to 45-106 $\mu$, loaded into a ceramic cell, initially heated to 500° C. (930° F.) for a 2 hour period and then heated to 1550° C. (2820° F.) at a rate of 2.5° C./minute under a mixture of nitrogen and hydrogen, i.e., a net reducing environment.

Initial sintering temperatures were indicated by downward curvature of a horizontal dilation contraction curve (base-line) generated as the sample was heated to temperatures approaching 1650° C. (3002°); with steeper downward curves being indicative of more rapid and severe sintering. A typical CHR dilation contraction curve for 1% Ni supported on a spray dried alpha-$Al_2O_3$ under nitrogen reveals an initial sintering temperature at about 1250° C. (2280° F.) with more rapid sintering at 1320° C. (2410° F.).

Analysis of the dilation-contraction curve under $H_2/N_2$ for Sample (1) reveals an initial sintering temperature of 1250° C. (2280° F.) with more rapid sintering at 1350° C. (2460° F.). The initial sintering temperature under $H_2/N_2$ is essentially equivalent to that for the fresh catalyst under $N_2$.

Analysis of Sample (2) revealed an initial sintering temperature of 1050° C. (1920° F.). This clearly shows the deleterious effect of the combustion conditions in leading to lower sintering temperatures of the nickel containing catalyst on subsequent exposure to $H_2/N_2$ environments (i.e., reducing conditions).

The redox chemistry of Ni and alumina during the initial combustion period and the formation of a $NiAl_2O_4/Al_2O_3$ mixture followed by exposure to reducing conditions apparently generates a less sintering resistant catalyst. By minimizing the exposure of catalyst to the initial combustion/heat-up conditions, the start-up procedure of the present invention insures a more sintering resistant catalyst will be present during syngas generation.

What is claimed is:

1. A method for starting up a fluidized bed or spouted bed steam reforming-partial oxidation process for converting a feed gas comprising methane to a product comprising hydrogen and carbon monoxide and unconnected methane which comprises the sequential steps of:

(a) heating to reaction temperature the fluidized bed or spouted bed comprised of essentially inert particles, in the presence of oxygen, in an oxiding atmosphere, and in the substantial absence of a reforming catalyst;

(b) converting to a reducing atmosphere; and (c) introducing into the fluidized bed or spouted bed sufficient Group VIII metal containing catalyst and converting, in the presence of oxygen, the feed gas to the product.

2. The method of claim 1 wherein the heating of the bed is effected by combusting a gas comprising methane with oxygen in an amount greater than the stoichiometric amount required for complete combustion of the gas.

3. The method of claim 1 wherein the Group VIII metal is nickel.

4. The method of claim 3 wherein the catalyst is a supported nickel and the nickel concentration is at least about 1 wt %.

5. The method of claim 4 wherein the bed is a fluidized bed.

6. The method of claim 1 wherein the unconnected methane in step (a) is less than about 12 vol %.

7. The method of claim 6 wherein the oxidizing atmosphere is maintained for no more than about 8 hours.

8. The method of claim 1 wherein the reaction temperature is at least about 1650° F.

9. The method of claim 8 wherein steam is present at least in step (c).

10. The process of claim 8 wherein steam is present in steps (a), (b), and (c).

11. The method of claim 1 wherein the reaction temperature ranges from 1650° F.-2000° F. and the pressure ranges from 20-40 atmospheres.

* * * * *